United States Patent
Hirasawa (10) Patent No.: US 7,573,150 B2
(45) Date of Patent: Aug. 11, 2009

(54) POWER SUPPLY CONTROL DEVICE

(75) Inventor: Takahiko Hirasawa, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 316 days.

(21) Appl. No.: 11/632,399

(22) PCT Filed: May 2, 2006

(86) PCT No.: PCT/JP2006/309531

§ 371 (c)(1),
(2), (4) Date: Jan. 12, 2007

(87) PCT Pub. No.: WO2006/121144

PCT Pub. Date: Nov. 16, 2006

(65) Prior Publication Data

US 2008/0002322 A1    Jan. 3, 2008

(30) Foreign Application Priority Data

May 11, 2005    (JP) .................... 2005-138671

(51) Int. Cl.
*B60L 1/00*    (2006.01)
(52) U.S. Cl. .................... 307/9.1; 307/132 EA
(58) Field of Classification Search ............... 307/9.1, 307/132 EA
See application file for complete search history.

(56) References Cited

U.S. PATENT DOCUMENTS 7,368,829 B2 *    5/2008    Tezuka ............... 307/9.1
2002/0070608 A1   6/2002    Matsuki et al.

FOREIGN PATENT DOCUMENTS

JP    A 2000-134707    5/2000
JP    A 2004-303691    10/2004
RU    2199788 C2       2/2003

* cited by examiner

*Primary Examiner*—Robert L. Deberadinis
(74) *Attorney, Agent, or Firm*—Oliff & Berridge, PLC (57) ABSTRACT

A control device determines that a system relay for precharging is welded when, after generation of a signal at the H level upon starting of a vehicle system to turn on only a cathode-side system relay, a precharge current is at least a reference value. When it is determined that the system relay for precharging is welded, the control device immediately turns off the cathode-side system relay without determining welding of cathode-side and anode-side system relays and performs discharging of a capacitor. In this situation, the control device determines welding of the cathode-side system relay based on a voltage between both ends of the capacitor. When it is determined that the system relay for precharging is not welded, welding of the cathode-side and anode-side system relays is determined upon termination of the vehicle system.

16 Claims, 4 Drawing Sheets

POWER SUPPLY CONTROL DEVICE

TECHNICAL FIELD

The present invention relates to a power supply control device capable of determination of welding of a relay.

BACKGROUND ART

In recent years, hybrid vehicles and electric vehicles are receiving attention as ecologically friendly vehicles. A hybrid vehicle uses, besides a conventional engine, a DC power supply, an inverter and a motor driven by the inverter as a mechanical power source. That is, the hybrid vehicle obtains mechanical power by driving the engine and also by converting a DC voltage from the DC power supply to an AC voltage with the inverter and rotating the motor with the AC voltage converted.

An electric vehicle uses a DC power supply, an inverter and a motor driven by the inverter as a mechanical power source.

Thus, each of the hybrid vehicle and the electric vehicle is equipped with a motor drive device including a DC power supply and an inverter. A capacitor is provided on an input side of the inverter to supply a noiseless DC voltage to the inverter. In addition, a system relay is provided between the DC power supply and the inverter (see, for example, Japanese Patent Laying-Open No. 2000-134707 and Japanese Patent Laying-Open No. 2004-303691).

In detail, Japanese Patent Laying-Open No, 2000-134707 discloses a system relay formed with a resistance R and a system relay SMR1 connected in series to a cathode of a DC power supply, a system relay SMR2 connected to the cathode of the DC power supply in parallel with resistance R and system relay SMR1, and a system relay SMR3 connected to an anode of the DC power supply. Welding of each of system relays SMR1-SMR3 is determined based on a voltage between both ends of a capacitor when system relays SMR1, SMR3 are turned on/off independently.

According to Japanese Patent Laying-Open No. 2000-134707, welding of system relay SMR3 on an anode side is first determined based on a voltage between both ends of the capacitor when only system relay SMR1, which is connected in series with resistance R, is turned on. Then, welding of system relay SMR1 or SMR2 on a cathode side is determined based on a voltage of the capacitor when only system relay SMR3 on the anode side is turned on.

Therefore, when system relay SMR1 connected in series with resistance R is welded and when only system relay SMR3 is turned on after welding of system relay SMR3 on the anode side is determined, a large-capacity battery is connected to a load side via resistance R and system relay SMR1 as well as system relay SMR3. As a result, a current flows from the large-capacity battery to the load side via resistance R and system relay SMR1 as well as system relay SMR3, and charges are supplied to the capacitor.

In this situation, since charges are supplied from the battery to the capacitor so as to compensate for discharging to a load, the voltage between both ends of the capacitor is not decreased and kept to substantially a constant level. Therefore, a large amount of current for supplying charges to the capacitor continuously flows through resistance R which is originally formed with specifications considering a resistance value and heat resistance sufficient to prevent an instantaneous large current (inrush current), and thus resistance R may be damaged due to unexpected heat production.

An object of the present invention is to provide a power supply control device capable of determination of welding of a relay while protecting a resistance.

DISCLOSURE OF THE INVENTION

According to the present invention, a power supply control device includes a first relay and a resistance connected in series between an anode of a DC power supply and a load, a second relay connected between the anode of the DC power supply and the load in parallel with the first relay and the resistance connected in series, a third relay connected between a cathode of the DC power supply and the load, a current sensor detecting a DC current flowing through the resistance, a capacity element having one terminal connected to a cathode side of the DC power supply via the third relay and the other terminal connected to an anode side of the DC power supply via the first relay and the resistance connected in series and the second relay to supply power supplied from the DC power supply to the load, a voltage sensor detecting a voltage between both ends of the capacity element, and a determination portion determining welding of the first to third relays. The determination portion includes a first determination portion determining welding of the first relay based on a DC current detected with the current sensor, a second determination portion determining welding of each of the second and third relays based on a voltage detected with the voltage sensor in each of situations wherein only the third relay is brought into conduction and only the first relay is brought into conduction according to a prescribed pattern after performance of the first determination portion, and a determination stop portion stopping performance of the second determination portion when the first determination portion determines that the first relay is welded.

According to the present invention, when the first relay is welded, the determination portion does not make determinations of welding of the second and third relays which are not possible. With this, the resistance can be protected from an excessive current which flows during determination of welding of the second relay.

The second determination portion preferably determines welding of the second relay based on a voltage detected with the voltage sensor when only the third relay is brought into conduction to supply power from the capacity element to the load. The determination stop portion includes a power supply portion bringing the second and third relays out of conduction to supply power from the capacity element to the load.

In particular, when the first relay is welded, the determination portion can bring the second and third relays out of conduction and discharge the capacity element to prevent an excessive current from flowing through the resistance.

The determination stop portion preferably further includes a third determination portion determining welding of the third relay based on a voltage detected with the voltage sensor when the second and third relays are brought out of conduction to supply power from the capacity element to the load.

More preferably, the third determination portion determines that the third relay is welded when the voltage sensor detects a voltage out of a prescribed voltage range when the second and third relays are brought out of conduction.

With this, welding of the third relay can further be determined by detecting a voltage between both ends of the capacity element during discharging of the capacity element.

The determination stop portion preferably further includes a third determination portion determining welding of the third relay based on a DC current detected with the current sensor when the second and third relays are brought out of conduction to supply power from the capacity element to the load.

More preferably, the third determination portion determines that the third relay is welded when the current sensor detects a DC current of at least a reference value when the second and third relays are brought out of conduction.

With this, welding of the third relay can further be determined by detecting a DC current flowing through the resistance during discharging of the capacity element.

The first determination portion preferably determines that the first relay is welded when the current sensor detects a DC current of at least a reference value when only the third relay is brought into conduction.

With this, welding of the first relay can be rapidly determined by detecting a DC current flowing through the resistance.

The second determination portion preferably determines that the second relay is welded when the voltage sensor detects a voltage out of a prescribed voltage range when only the third relay is brought into conduction to supply power from the capacity element to the load. The second determination portion also determines that the third relay is welded when the voltage sensor detects a voltage of at least a threshold value when only the first relay is brought into conduction to supply power from the capacity element to the load.

With this, when it is determined that the first relay is not welded, welding of the second and third relays can be determined based on a variation in a voltage between both ends of the capacity element during discharging thereof.

According to the present invention, since welding of the second and third relays is not determined when the first relay is welded, the resistance can be protected from an excessive current which flows during determination of welding. As a result, a breakdown of the resistance can be prevented.

BEST MODE FOR CARRYING OUT THE INVENTION

An embodiment of the present invention will now be described in detail referring to the drawings. It is to be noted that, the same characters in the drawings indicate the same or corresponding portions.

Figure 1:
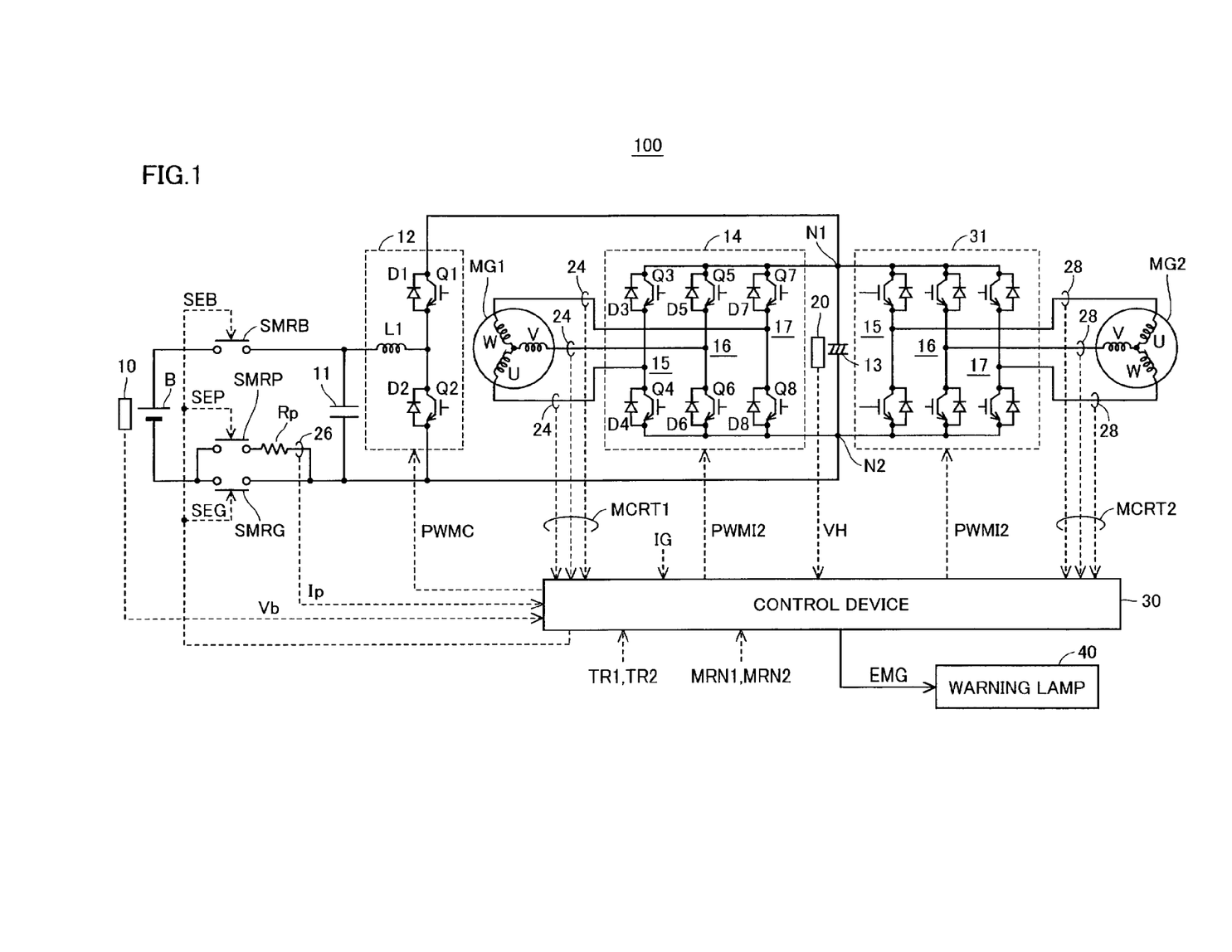
FIG. 1 is a schematic block diagram of a motor drive device including a power supply control device according to an embodiment of the present invention.

FIG. 1 is a schematic block diagram of a motor drive device including a power supply control device according to the embodiment of the present invention.

Referring to FIG. 1, a motor drive device 100 includes a DC power supply B, voltage sensors 10, 20, system relays SMRB, SMRP, SMRG, capacitors 11, 13, a boost converter 12, inverters 14, 31, current sensors 24, 26, 28, and a control device 30.

A motor generator MG1 is mounted on, for example, a hybrid vehicle. Motor generator MG1 is a motor connected to an engine (not shown) of the hybrid vehicle, which has a function of a generator driven by the engine and also operates as an electric motor for the engine which can perform, for example, starting of the engine. Fuel economy and exhaust gas of the hybrid vehicle can be improved by adjusting a torque for electric power generation of motor generator MG1 to control to keep the engine in an efficient driving state.

A motor generator MG2 is mounted on, for example, a hybrid vehicle. Motor generator MG2 is a drive motor for generating a torque for driving a driving wheel of the hybrid vehicle. In addition, when motor generator MG2 is rotated with rotation of the driving wheel during deceleration of the vehicle, for example, motor generator MG2 can function as a generator (a function of so-called regeneration).

System relay SMRB is connected in series between a cathode of DC power supply B and a positive electrode of capacitor 11. System relay SMRG is connected in series between an anode of DC power supply B and a negative electrode of capacitor 11. System relay SMRP and a resistance Rp are connected in parallel with system relay SMRG between the anode of DC power supply B and the negative electrode of capacitor 11.

Boost converter 12 includes a reactor L1, NPN transistors Q1, Q2 and diodes D1, D2. Reactor L1 has one end connected to a power supply line of DC power supply B and the other end connected to an intermediate point between NPN transistor Q1 and NPN transistor Q2, that is, a point between an emitter of NPN transistor Q1 and a collector of NPN transistor Q2. NPN transistors Q1, Q2 are connected in series between the power supply line and an earth line. In addition, a collector of NPN transistor Q1 is connected to the power supply line and an emitter of NPN transistor Q2 is connected to the earth line. Diodes D1, D2 for flowing currents from an emitter side to a collector side are respectively connected between collectors and emitters of NPN transistors Q1, Q2.

Inverter 14 is formed with a U phase arm 15, a V phase arm 16 and a W phase arm 17. U phase arm 15, V phase arm 16 and W phase arm 17 are provided in parallel with each other between the power supply line and the earth line.

U phase arm 15 is formed with NPN transistors Q3, Q4 connected in series, V phase arm 16 is formed with NPN transistors Q5, Q6 connected in series, and W phase arm 17 is formed with NPN transistors Q7, Q8 connected in series. Diodes D3-D8 for flowing currents from the emitter side to the collector side are respectively connected between collectors and emitters of NPN transistors Q3-Q8.

An intermediate point of each phase arm is connected to each phase end of each phase coil of motor generator MG1. That is, motor generator MG1 is a permanent magnet motor of three phases formed with three coils of U, V and W phases having respective one ends connected in common at a median point. The other end of a U phase coil is connected to an intermediate point between NPN transistors Q3, Q4, the other end of a V phase coil is connected to an intermediate point between NPN transistors Q5, Q6, and the other end of a W phase coil is connected to an intermediate point between NPN transistors Q7, Q8.

Inverter 31 has the same construction as inverter 14.

DC power supply B is formed with a secondary battery such as a nickel metal hydride battery or a lithium-ion battery. Voltage sensor 10 detects a DC voltage Vb output from DC power supply B, and outputs detected DC voltage Vb to control device 30.

System relays SMRB, SMRG, SMRP are respectively turned on/off with signals SEB, SEG, SEP from control device 30. More specifically, system relays SMRB, SMRG, SMRP are respectively turned on with signals SEB, SEG, SEP at the H (logic high) level, and respectively turned off with signals SEB, SEG, SEP at the L (logic low) level.

Capacitor 11 smoothes DC voltage Vb supplied from DC power supply B and supplies smoothed DC voltage Vb to boost converter 12.

Boost converter 12 boosts DC voltage Vb supplied from capacitor 11 and supplies the result to capacitor 13. More specifically, boost converter 12 receives a signal PWMC from control device 30, boosts DC voltage Vb according to a period of turning-on of NPN transistor Q2 with signal PWMC, and supplies the result to capacitor 13.

In addition, when boost converter 12 receives signal PWMC from control device 30, boost converter 12 lowers a DC voltage supplied from inverter 14 and/or inverter 31 via capacitor 13 to charge DC power supply B.

Capacitor 13 smoothes a DC voltage from boost converter 12 and supplies a smoothed DC voltage to inverters 14, 31 via nodes N1, N2. Voltage sensor 20 detects a voltage VH between both ends of capacitor 13 (corresponding to an output voltage of boost converter 12 and an input voltage to inverters 14, 31, which is the same in the following), and outputs detected voltage VH to control device 30.

When the DC voltage is supplied from capacitor 13, inverter 14 converts the DC voltage into an AC voltage based on a signal PWMI1 from control device 30 to drive motor generator MG1. With this, motor generator MG1 is driven to generate a torque specified with a torque instruction value TR1.

In addition, during regenerative braking of the hybrid vehicle having motor drive device 100 mounted thereon, inverter 14 converts an AC voltage generated by motor generator MG1 into a DC voltage based on signal PWMI1 from control device 30, and supplies the converted DC voltage to boost converter 12 via capacitor 13. It is to be noted that, the "regenerative braking" used herein includes breaking involving regeneration when a foot brake operation is performed by a driver of the hybrid vehicle, or deceleration (or stopping of acceleration) of the vehicle with regeneration by turning-off of an accelerator pedal during driving rather than by the operation of the foot brake.

When the DC voltage is supplied from capacitor 13, inverter 31 converts the DC voltage into an AC voltage based on a signal PWMI2 from control device 30 to drive motor generator MG2. With this, motor generator MG2 is driven to generate a torque specified with a torque instruction value TR2.

In addition, during regenerative braking of the hybrid vehicle having motor drive device 100 mounted thereon, inverter 31 converts an AC voltage generated by motor generator MG2 into a DC voltage based on signal PWMI2 from control device 30, and supplies the converted DC voltage to boost converter 12 via capacitor 13.

Current sensor 24 detects a motor current MCRT1 flowing through motor generator MG1 and outputs detected motor current MCRT1 to control device 30. Current sensor 26 detects a current Ip flowing through resistance Rp (hereafter also referred to as "precharge current Ip") and outputs detected precharge current Ip to control device 30. Current sensor 28 detects a motor current MCRT2 flowing through motor generator MG2 and outputs detected motor current MCRT2 to control device 30.

Control device 30 receives from voltage sensor 10 DC voltage Vb output from DC power supply B, receives motor currents MCRT1, MCRT2 from respective current sensors 24, 28, receives voltage VH between both ends of capacitor 13 from voltage sensor 20, receives torque instruction values TR1, TR2 and motor rotation numbers MRN1, MRN2 from an external ECU (Electrical Control Unit), and receives a signal IG from an ignition key (not shown).

When control device 30 receives signal IG at the H level from the ignition key, control device 30 determines welding of system relay SMRP based on precharge current Ip received from current sensor 26 by a method described below.

In this situation, when it is determined that system relay SMRP is not welded, control device 30 controls system relays SMRB, SMRP, SMRG to precharge capacitor 13.

Furthermore, after completion of precharging of capacitor 13, control device 30 generates signal PWMI1 based on voltage VH, motor current MCRT1 and torque instruction value TR1, which signal PWMI1 is for switching control of NPN transistors Q3-Q8 of inverter 14 during driving of motor generator MG1 by inverter 14, and outputs generated signal PWMI1 to inverter 14.

Control device 30 also generates signal PWMI2 based on voltage VH, motor current MCRT2 and torque instruction value TR2, which signal PWMI2 is for switching control of NPN transistors Q3-Q8 of inverter 31 during driving of motor generator MG2 by inverter 31, and outputs generated signal PWMI2 to inverter 31.

Furthermore, when inverter 14 (or 31) drives motor generator MG1 (or MG2), control device 30 generates signal PWMC for switching control of NPN transistors Q1, Q2 of boost converter 12 based on DC voltage Vb, voltage VH, torque instruction value TR1 (or TR2), and motor rotation number MRN1 (or MRN2) by a method described below, and outputs the signal to boost converter 12.

When control device 30 receives signal IG at the L level from the ignition key, control device 30 determines welding of system relays SMRG, SMRB by a method described below based on voltage VH between both ends of capacitor 13 which is received from voltage sensor 20. That is, control device 30 determines welding of system relay SMRP upon starting of a vehicle system and, when it is determined that system relay SMRP is not welded, determines welding of system relays SMRG, SMRB upon termination of the vehicle system.

When it is determined that at least one of system relays SMRB, SMRP, SMRG is welded, control device 30 generates a signal EMG for lighting up a warning lamp 40 and outputs the signal to warning lamp 40. Warning lamp 40 is lighted up in response to signal EMG from control device 30.

Figure 2:
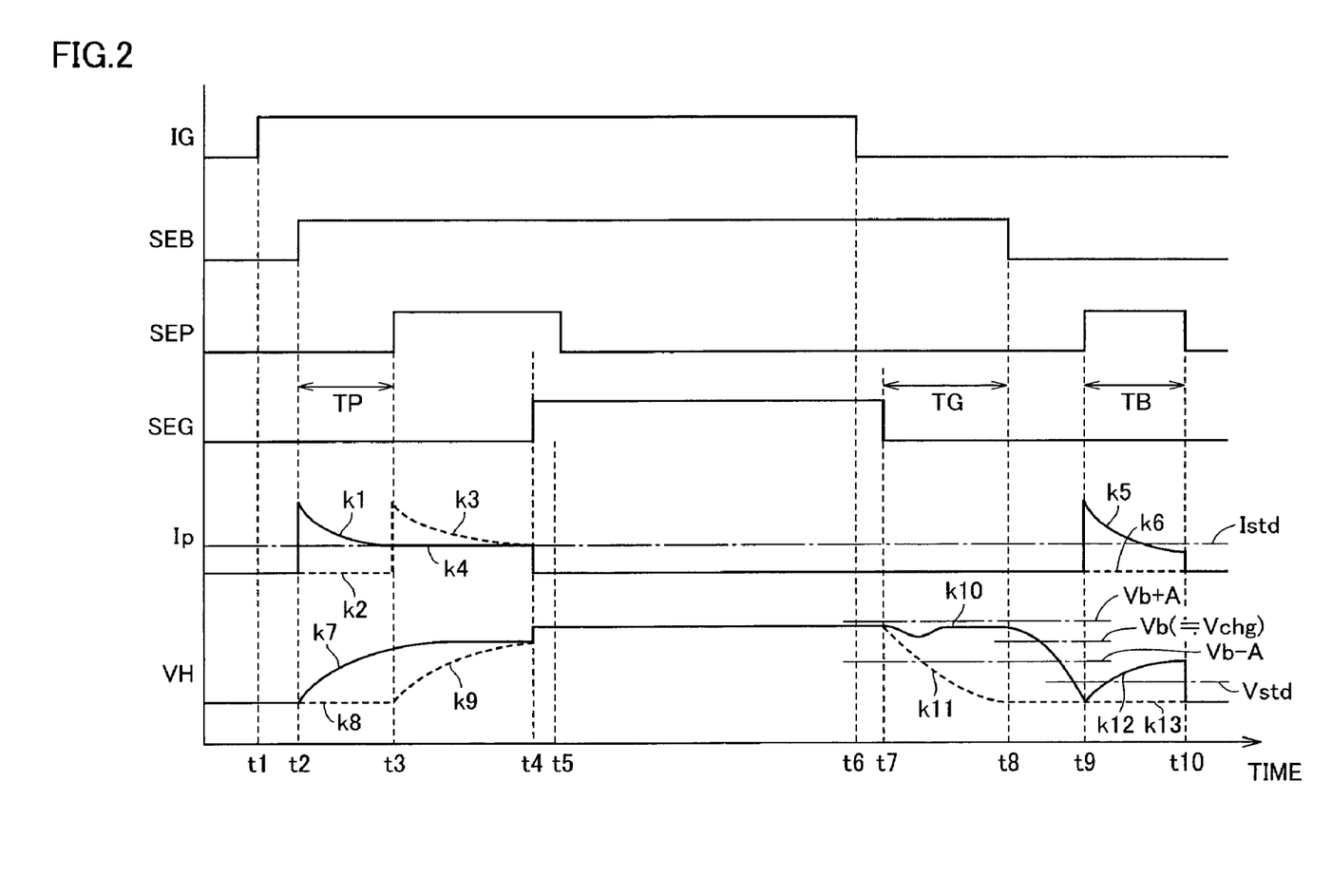
FIG. 2 is a timing chart for describing operations of determining welding of system relays SMRB, SMRP and SMRG shown in FIG. 1.

FIG. 2 is a timing chart for describing operations of determining welding of system relays SMRB, SMRP, SMRG shown in FIG. 1.

Referring to FIG. 2, when signal IG from the external ECU is switched from the L level to the H level at a timing t1 to turn on the ignition key, control device 30 only generates signal SEB at the H level at a timing t2 and outputs the signal to system relay SMRB. With this, only system relay SMRB is turned on (which corresponds to a conductive state). Signal SEB is switched to the L level at a timing t8 which is later than a timing t6 of turning-off of the ignition key on termination of the system. That is, control device 30 turns on system relay SMRB during a period from timing t2 to timing t8.

Then, control device 30 generates signal SEP at the H level at a timing t3 and outputs the signal to system relay SMRP. With this, system relay SMRP is turned on.

In a period TP from timing t2 to timing t3, control device 30 determines as to whether system relay SMRP is welded or not based on precharge current Ip from current sensor 26. In detail, control device 30 determines that system relay SMRP is welded when, after timing t2 at which only system relay SMRB is turned on, current sensor 26 detects precharge current Ip as indicated with a curve k1 which abruptly increases beyond a reference value Istd and then decreases. On the other hand, control device 30 determines that system relay SNRP is not welded when current sensor 26 detects precharge current Ip of zero as indicated with a straight line k2 during period TP.

When it is determined that system relay SMRP is not welded, control device 30 generates signal SEP at the H level at timing t3 and outputs the signal to system relay SMRP. With this, DC power supply B is connected to boost converter 12 via system relay SMRB, system relay SMRP and resistance Rp. Then, DC power supply B starts precharging of capacitor 13 via reactor L1 and diode D1 of boost converter 12.

When precharging of capacitor 13 is started at timing t3, precharge current Ip abruptly increases and then gradually decreases as indicated with a curve k3. As indicated with a curve k9, voltage VH gradually increases after timing t3 and reaches a prescribed precharge voltage Vchg at a timing t4.

After timing t3, control device 30 determines as to whether voltage VH from voltage sensor 20 reaches precharge voltage Vchg or not and, when voltage VH reaches precharge voltage Vchg, generates signal SEG at the H level at timing t4 and outputs the signal to system relay SMRG, and generates signal SEP at the L level at a timing t5 and outputs the signal to system relay SMRP. Signal SEG at the H level may be generated when it is determined that a time period allowing voltage VH to reach precharge voltage Vchg was over.

When signal SEG at the H level is output to system relay SMRG at timing t4, DC power supply B supplies a DC current to capacitor 13 via system relays SMRB, SMRG, and therefore precharging of capacitor 13 is ended. That is, capacitor 13 is precharged during a period from timing t3 to timing t4. With a construction as described above, system relay SMRP is turned off after system relay SMRG is turned on, which prevents an inrush current into capacitor 13 and a DC voltage can be supplied from DC power supply B to capacitor 13.

Then, DC power supply B supplies DC voltage Vb to capacitor 13 via system relays SMRB, SMRG and boost converter 12, and capacitor 13 smoothes DC voltage Vb from DC power supply B and supplies the result to inverters 14, 31.

Thereafter, control device 30 generates signal PWMI1 (or PWMI2) based on torque instruction value TR1 (or TR2), voltage VH and motor current MCRT1 (or MCRT2) and outputs the signal to NPN transistors Q3-Q8.

Then, inverter 14 (or 31) converts the DC voltage from capacitor 13 into an AC voltage in response to signal PWMI1 (or PWMI2) to drive motor generator MG1 (or MG2). When motor drive device 100 drives motor generator MG1 (or MG2), inverter 14 (or 31) also converts an AC voltage generated by motor generator MG1 (or MG2) into a DC voltage in response to signal PWMI1 (or PWMI2) to charge DC power supply B.

Thereafter, when control device 30 receives signal IG at the L level from the ignition key at timing t6 upon termination of the vehicle system, control device 30 generates signal SEG at the L level at timing t7 and outputs the signal to system relay SMRG. With this, system relay SMRG is turned off. On the other hand, system relay SMRB is kept in an ON state until timing t8 at which signal SEB is switched to the L level.

Furthermore, at timing t7, control device 30 generates signals PWMI1, PWMI2 for turning on all of NPN transistors Q3-Q8 and outputs the signals to NPN transistors Q3-Q8 of inverters 14, 31. In response to turning-on of NPN transistors Q3-Q8 of inverter 14 (or 31), power stored in capacitor 13 is consumed by motor generators MG1, MG2 and discharging of capacitor 13 is started. This discharging of capacitor 13 is performed by driving motor generators MG1, MG2 with so-called zero-torque control, that is, consuming power without generating a torque.

If system relay SMRG is not welded when discharging of capacitor 13 is started, since capacitor 13 is electrically separated from DC power supply B by system relay SMRG in an OFF state, capacitor 13 cannot receive supply of power from DC power supply B and voltage VH between both ends thereof gradually decreases.

On the other hand, if system relay SMRG is welded, capacitor 13 is electrically coupled to DC power supply B via system relay SMRB and system relay SMRG, and is charged by receiving supply of power from DC power supply B. Therefore, voltage VH between both ends of capacitor 13 is not decreased with discharging and maintained at a precharge voltage Vchg level (substantially corresponding to a DC voltage Vb level).

Therefore, control device 30 determines welding of system relay SMRG based on voltage VH between both ends of capacitor 13 during discharging of capacitor 13 which is performed on termination of the vehicle system. In detail, control device 30 determines as to whether system relay SMRG is welded or not based on voltage VH from voltage sensor 20 in a period TG after timing t7.

Control device 30 determines that system relay SMRG is welded when, after turning-off of system relay SMRG at timing t7, voltage sensor 20 detects voltage VH as indicated with a curve k10 which temporarily decreases but merely varies within a prescribed voltage range. On the other hand, control device 30 determines that system relay SMRG is not welded when, in period TG, voltage sensor 20 detects voltage VH as indicated with a curve k11 which gradually decreases to go below the prescribed voltage range. The prescribed voltage range is set to have precharge voltage Vchg (≈DC voltage Vb) as a median value and to include a detection error A of voltage sensor 20, as indicated with a long dashed short dashed line in the drawing.

When it is determined that system relay SMRG is not welded in period TG, control device 30 generates signal SEB at the L level at timing t8 and outputs the signal to system relay SMRB. With this, system relay SMRB is turned off. Voltage VH between both ends of capacitor 13 is decreased substantially to a zero level in response to completion of discharging.

Thereafter, control device 30 only generates signal SEP at the H level at a timing t9 and outputs the signal to system relay SMRP, and only generates signal SEP at the L level at a timing t10 and outputs the signal to system relay SMRP. That is, control device 30 turns on only system relay SMRP in a period TB from timing t9 to timing t10.

Then, control device 30 determines as to whether system relay SMRB is welded or not based on voltage VH from voltage sensor 20 in period TB from timing t9 to timing t10.

In detail, control device 30 determines that system relay SMRB is welded when, after timing t9 at which only system relay SMRP is turned on, voltage sensor 20 detects voltage VH as indicated with a curve k12 which gradually increases beyond a prescribed threshold value Vstd. On the other hand, control device 30 determines that system relay SMRB is not welded when voltage sensor 20 detects voltage VH of at most threshold value Vstd as indicated with a curve k13 during period TB. Prescribed threshold value Vstd is set to have a zero voltage as a reference and to include a detection error of voltage sensor 20.

As described above, according to the power supply control device of the present invention, welding of system relay SMRP is determined upon starting of the vehicle system and, when it is determined that system relay SMRP is not welded, welding of system relays SMRG, SMRB is determined upon termination of the vehicle system. The power supply control device is formed to have such construction for the following reasons.

First, referring to FIG. 2, since system relay SMRP is turned on upon starting of the vehicle system to precharge capacitor 13, welding thereof is determined prior to this turn-on operation.

Next, as described above, whether system relay SMRB is welded or not can be determined based on voltage VH between both ends of capacitor 13 detected with voltage sensor 20 in a period in which only system relay SMRP is turned on. In detail, control device 30 determines that system relay SMRB is welded when voltage sensor 20 detects voltage VH which gradually increases to threshold value Vstd in the period. Therefore, welding of system relay SMRB can also be determined upon starting of the vehicle system besides termination of the vehicle system. Determination of welding based on voltage VH between both ends of capacitor 13, however, requires a long time since a transition time determined by a product of a capacity value C of capacitor 13 and a resistance value R of resistance Rp is required for increasing of voltage VH. Therefore, determining of welding of system relay SMRB upon starting of the vehicle system is disadvantageous because a time required to complete starting of the vehicle system becomes longer. Therefore, the time required for starting of the vehicle system can be made shorter with the construction in which welding of system relay SMRB is determined upon termination of the vehicle system.

Finally, since system relay SMRG is on an anode side of DC power supply B as system relay SMRP, welding thereof can be determined based on a variation in voltage VH between both ends of capacitor 13 after the timing of turning on only system relay SMRB. A transition characteristic of voltage VH cannot be observed, however, since there is no resistance element in a current path from the cathode of DC power supply B through system relay SMRB, capacitor 13 and system relay SMRG to the anode of DC power supply B. Therefore, welding of system relay SMRG is determined based on a variation in voltage VH during discharging of capacitor 13 on termination of the vehicle system.

For the reasons described above, the power supply control device of the present invention determines welding of system relay SMRP upon starting of the vehicle system and, if system relay SMRP is not welded, determines welding of system relays SMRG, SMRB upon termination of the vehicle system.

On the other hand, according to the power supply control device of the present invention, when it is determined that system relay SMRP is welded in period TP on starting of the vehicle system, starting of the vehicle system is stopped at that time point and discharging of capacitor 13 as indicated in FIG. 2 after timing t7 is immediately performed. In this situation, according to FIG. 2, system relay SMRB is continuously in the ON state since turned on in response to signal SEP at the H level at timing t2. System relay SMRG is not turned on at timing t4 and maintained in the OFF state.

A situation will now be considered in which discharging of capacitor 13 is started while system relay SMRB is turned on according to the timing chart of FIG. 2 when system relay SMRP is welded.

Since system relay SMRP is welded, both of system relays SMRB, SMRP are turned on. Therefore, capacitor 13 is electrically coupled to DC power supply B via system relay SMRB and system relay SMRG and receives supply of power from DC power supply B. Accordingly, voltage VH between both ends of capacitor 13 is not decreased with discharging and maintained at the precharge voltage Vchg level (substantially corresponding to the DC voltage Vb level).

In this situation, a large amount of current continuously flows through resistance Rp which is connected in series to system relay SMRP, since power is supplied from DC power supply B to capacitor 13 in period TG. Resistance Rp, however, is originally formed as a resistance for precharging of capacitor 13 and has specifications considering a flow of relatively small precharge current Ip during a period in which voltage VH between both ends of capacitor 13 varies from zero to precharge voltage Vchg, and is not for a large current. Therefore, if discharging of capacitor 13 is performed while system relay SMRB is turned on as in FIG. 2 when system relay SMRP is welded, resistance Rp may be damaged due to heat generated with the large current.

It is to be noted that, when system relay SMRP is welded, since voltage VH is maintained substantially at the DC voltage Vb level in period TG, determination of welding of system relay SMRG based on voltage VH becomes impossible. In addition, since capacitor 13 is not discharged in period TB, voltage VH becomes higher than threshold value Vstd and determination of welding of system relay SMRB becomes difficult.

That is, when welding of system relays SMRG, SMRB is to be determined as usual upon termination of the vehicle system when system relay SMRP is welded, an excessive load is applied to resistance Rp and an accurate determination of welding cannot be made.

Therefore, the power supply control device according to the present invention has a construction such that, when it is determined that system relay SMRP is welded upon starting of the vehicle system, system relay SMRB is immediately turned off without determining welding of system relays SMRG, SMRB and capacitor 13 is discharged while system relay SMRB is turned off.

With this, system relay SMRB is already turned off and supply of power from DC power supply B to capacitor 13 is stopped when discharging of capacitor 13 is started. Therefore, flowing of the large current into resistance Rp is prevented and damaging of resistance Rp can be avoided.

Furthermore, the power supply control device according to the present invention has a construction such that, when it is determined that system relay SMRP is welded, welding of system relay SMRB is determined based on voltage VH from voltage sensor 20 during discharging of capacitor 13 which is performed after turning-off of system relay SMRB.

With this, welding of system relays SMRP and SMRB can be determined while protecting resistance Rp from the large current.

Figure 3:
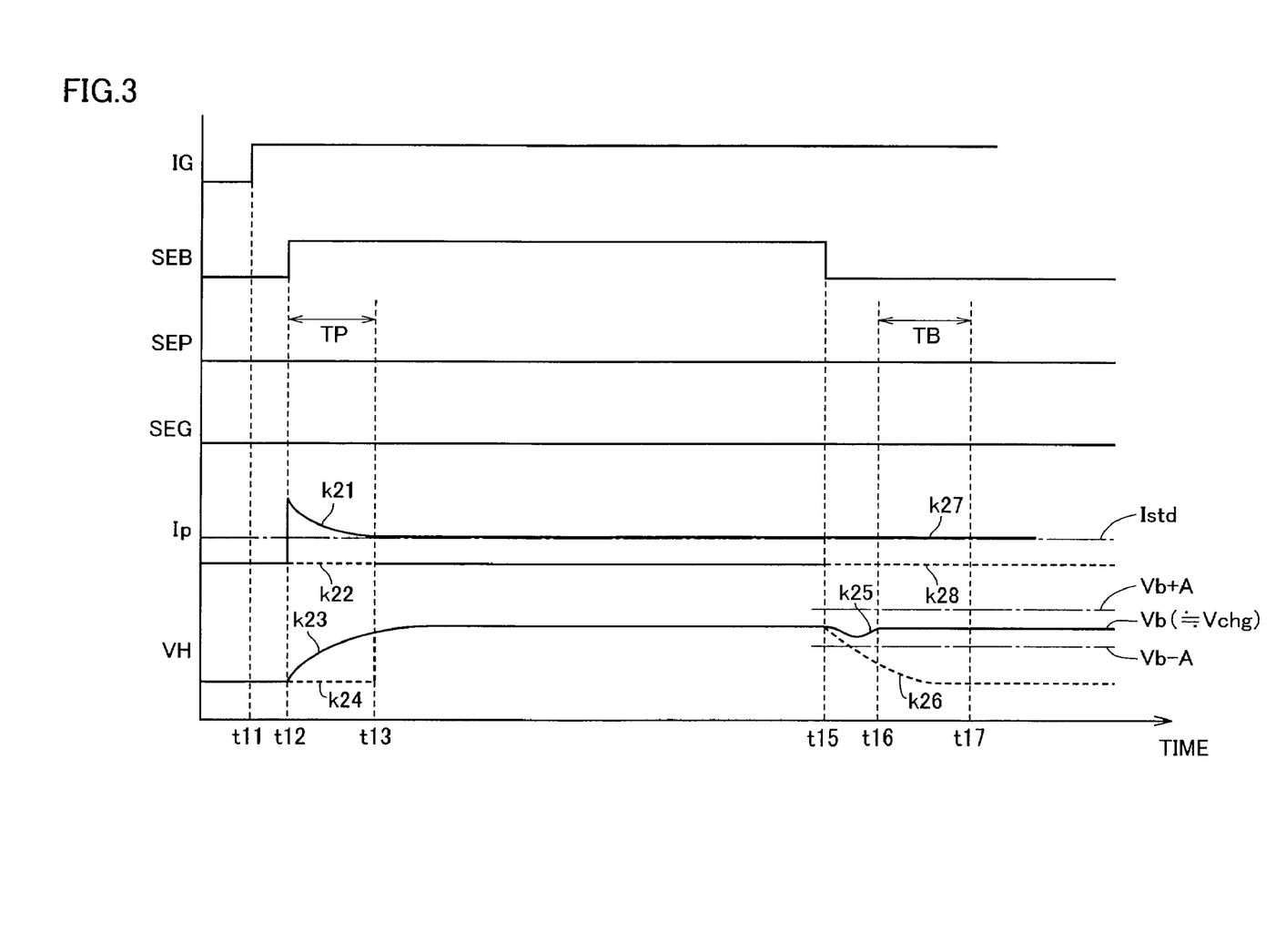
FIG. 3 is a timing chart for describing operations of determining welding of system relays SMRP and SMRB.

FIG. 3 is a timing chart for describing operations of determining welding of system relays SMRP, SMRB.

Referring to FIG. 3, when signal IG from the external ECU is switched from the L level to the H level at a timing t11 to turn on the ignition key, control device 30 only generates signal SEB at the H level at a timing t12 and outputs the signal to system relay SMRB.

Then, in a period TP from timing t12 to a timing t3, control device 30 determines as to whether system relay SMRP is welded or not based on precharge current Ip from current sensor 26. As described with FIG. 2, control device 30 determines that system relay SMRP is welded when, after timing t12 at which only system relay SMRB is turned on, current sensor 26 detects precharge current Ip as indicated with a curve k21 which abruptly increases beyond reference value Istd and then decreases. On the other hand, control device 30 determines that system relay SMRP is not welded when current sensor 26 detects precharge current Ip of zero as indicated with a straight line k22 during period TP.

When it is determined that system relay SMRP is welded, control device 30 stops starting of the vehicle system and performs discharging of capacitor 13 according to a procedure described below. When it is determined that system relay SMRP is not welded, control device 30 performs precharging of capacitor 13, operates the vehicle system thereafter, and determines welding of system relays SMRG, SMRB upon termination of the vehicle system according to a procedure described with FIG. 2.

Referring to FIG. 3, first, control device 30 generates signal SEB at the L level at a timing t15 and outputs the signal to system relay SMRB. With this, system relay SMRB is turned off. That is, by turning-off of system relay SMRB, DC power supply B and capacitor 13 are electrically separated from each other and supply of power from DC power supply B to capacitor 13 is stopped.

Furthermore, at timing t15, control device 30 generates signals PWMI1, PWMI2 for turning on all of NPN transistors Q3-Q8 and outputs the signals to NPN transistors Q3-Q8 of inverters 14, 31. In response to turning-on of NPN transistors Q3-Q8 of inverter 14 (or 31), power stored in capacitor 13 is consumed by motor generators MG1, MG2 and discharging of capacitor 13 is started. As described above, discharging of capacitor 13 is performed by driving motor generators MG1, MG2 with the zero-torque control.

If system relay SMRB is not welded when discharging of capacitor 13 is started, since capacitor 13 is electrically separated from DC power supply B by system relay SMRB in an OFF state, capacitor 13 cannot receive supply of power from DC power supply B and voltage VH gradually decreases.

On the other hand, if system relay SMRB is welded, capacitor 13 is electrically coupled to DC power supply B via system relay SMRB and system relay SMRP, and is charged by receiving supply of power from DC power supply B. Therefore, voltage VH between both ends of capacitor 13 is not decreased with discharging and maintained substantially at the precharge voltage Vchg level (corresponding to the DC voltage Vb level).

Therefore, control device 30 determines welding of system relay SMRB based on voltage VH between both ends of capacitor 13 during discharging of capacitor 13 which is performed on termination of the vehicle system. In detail, control device 30 determines as to whether system relay SMRB is welded or not based on voltage VH from voltage sensor 20 in a period TB from a timing t16 to a timing t17.

Control device 30 determines that system relay SMRB is welded when, after turning-off of system relay SMRB at timing t15, voltage sensor 20 detects voltage VH as indicated with a curve k25 which temporarily decreases but merely varies within a prescribed voltage range. On the other hand, control device 30 determines that system relay SMRB is not welded when, in period TB, voltage sensor 20 detects voltage VH as indicated with a curve k26 which gradually decreases to go below the prescribed voltage range. The prescribed voltage range is set to have precharge voltage Vchg (≈DC voltage Vb) as a median value and to include detection error A of voltage sensor 20, as indicated with a long dashed short dashed line in the drawing.

With this, when system relay SMRP is welded, system relay SMRB is first turned off and discharging of capacitor 13 is performed while capacitor 13 and DC power supply B are electrically separated from each other. Therefore, resistance Rp connected in series to system relay SMRP can be protected from the large current and reliability of the power supply control device can be increased. Furthermore, welding of system relay SMRB can be detected based on voltage VH between both ends of discharged capacitor 13.

It is to be noted that, welding of system relay SMRB can also be determined in period TB based on precharge current Ip from current sensor 26. More specifically, control device 30 determines that system relay SMRB is welded when, in period TB after timing t15 at which system relay SMRB is turned off, current sensor 26 detects precharge current Ip of at least a reference value as indicated with a curve k27. On the other hand, control device 30 determines that system relay SMRB is not welded when current sensor 26 detects precharge current Ip lower than the reference value as indicated with a curve k28 in period TB.

Figure 4:
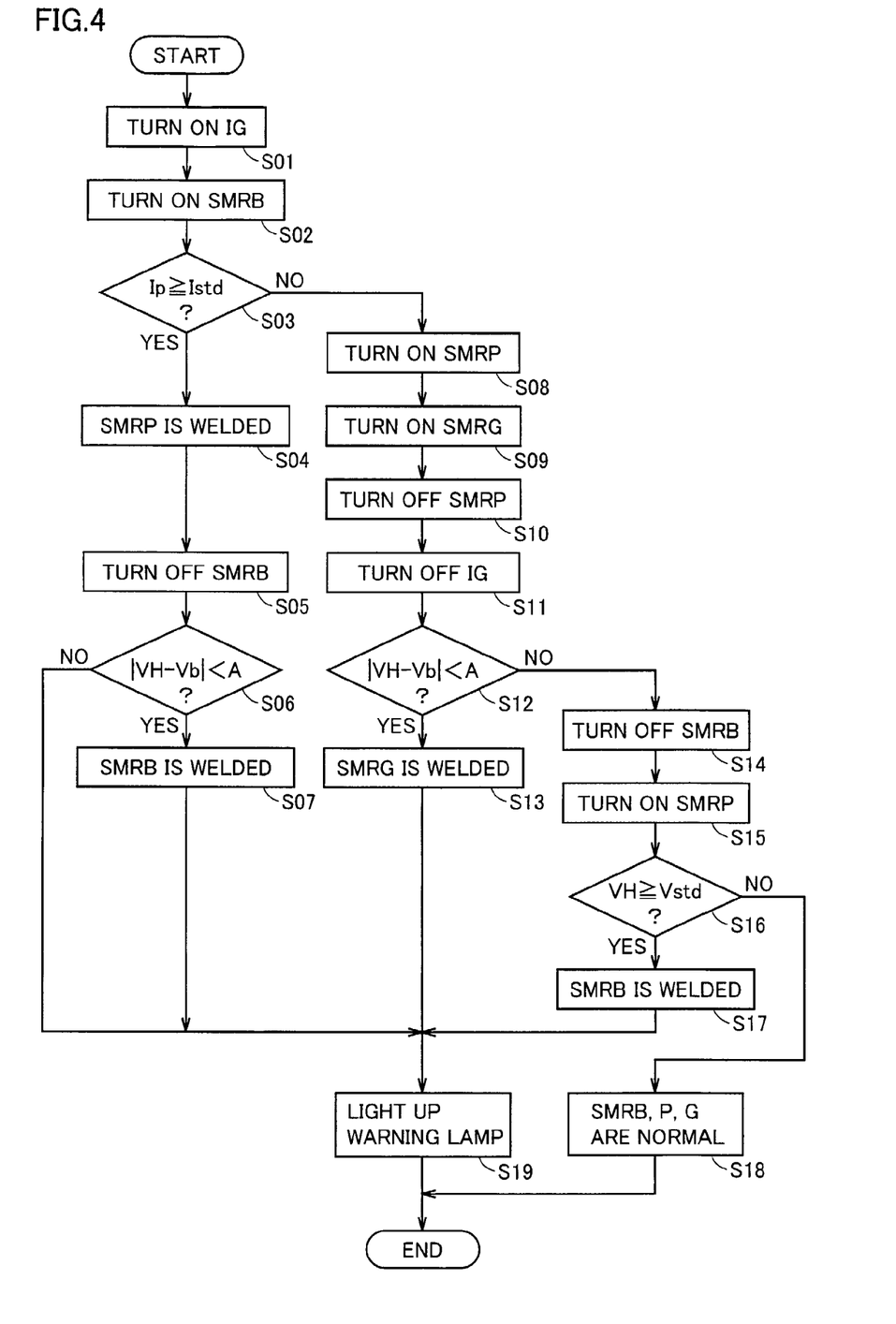
FIG. 4 is a flow chart for describing the operations of determining welding of system relays SMRB, SMRP and SMRG shown in FIG. 1.

FIG. 4 is a flow chart for describing the operations of determining welding of system relays SMRB, SMRP and SMRG shown in FIG. 1.

Referring to FIG. 4, when a series of operations is started, ignition key IG is turned on (step S01). Then, control device 30 generates signal SEB at the H level and outputs the signal to system relay SMRB to turn on only system relay SMRB (step S02). Thereafter, control device 30 receives precharge current Ip from current sensor 26 and determines as to whether precharge current Ip received is at least reference value Istd or not (step S03).

If precharge current Ip is lower than reference value Istd in step S03, control device 30 determines that system relay SMRP is normal (not welded), generates signal SEP at the H level and outputs the signal to system relay SMRP to turn on system relay SMRP (step S08). With this, DC power supply B is connected to the both ends of capacitor 13 via system relay SMRB, system relay SMRP and resistance Rp, and starts precharging of capacitor 13.

When voltage VH between both ends of capacitor 13 reaches precharge voltage Vchg, control device 30 generates signal SEG at the H level and outputs the signal to system relay SMRG. With this, system relay SMRG is turned on and precharging of capacitor 13 is ended (step S09). Then, control device 30 generates signal SEP at the L level and outputs the signal to system relay SMRP to turn off only system relay SMRP (step S10).

Then, when ignition key IG is turned off on termination of the vehicle system (step S11), control device 30 turns on NPN transistors Q3-Q8 of inverters 14, 31 to drive motor generators MG1, MG2 and performs discharging of capacitor 13. In this situation, control device 30 continuously sets system relay SMRB to the ON state from step S02.

Then, control device 30 determines as to whether voltage VH between both ends of capacitor 13 is within the prescribed voltage range or not (step S12). More specifically, control device 30 determines as to whether an absolute value of a voltage difference between voltage VH and DC voltage Vb (|VH−Vb|) is smaller than detection error A of voltage sensor 20 or not.

When the absolute value of the voltage difference |VH−Vb| is smaller than detection error A of voltage sensor 20, that is, when voltage VH is substantially at the DC voltage Vb level, control device 30 determines that system relay SMRG is welded (step S13).

On the other hand, in step S12, when the absolute value of the voltage difference |VH−Vb| is not less than detection error A of voltage sensor 20, that is, when voltage VH is not at the DC voltage Vb level, it is determined that system relay SMRG is normal (not welded). Control device 30 then generates signal SEB at the L level and outputs the signal to system relay SMRB to turn off system relay SMRB (step S14). Control device 30 further generates signal SEP at the H level and outputs the signal to system relay SMRP to turn on system relay SMRP (step S15). Then, control device 30 receives voltage VH from voltage sensor 20 and determines as to whether received voltage VH is at least threshold value Vstd or not (step S16).

When voltage VH is at least threshold value Vstd, control device 30 determines that system relay SMRB is welded (step S17). On the other hand, in step S16, when voltage VH is lower than threshold value Vstd, control device 30 determines that system relay SMRB is normal (not welded). That is, control device 30 determines that all of system relays SMRP, SMRG, SMRB are normal (not welded) (step S18), and ends the series of operations.

Returning to step S03, when precharge current Ip is at least reference value Istd, control device 30 determines that system relay SMRP is welded (step S04). When it is determined that system relay SMRP is welded, control device 30 generates signal SEB at the L level and outputs the signal to system relay SMRB to turn off system relay SMRB (step S05).

Next, control device 30 turns on NPN transistors Q3-Q8 of inverters 14, 31 to drive motor generators MG1, MG2 and performs discharging of capacitor 13. In this situation, control device 30 determines as to whether voltage VH between both ends of capacitor 13 is within the prescribed voltage range or not (step S06). More specifically, control device 30 determines as to whether the absolute value of the voltage difference between voltage VH and DC voltage Vb (|VH−Vb|) is smaller than detection error A of voltage sensor 20 or not.

When the absolute value of the voltage difference |VH−Vb| is smaller than detection error A of voltage sensor 20, that is, when voltage VH is substantially at the DC voltage Vb level, control device 30 determines that system relay SMRB is welded (step S07). In this situation, control device 30 determines that system relays SMRP and SMRB are welded.

On the other hand, in step S06, when the absolute value of the voltage difference |VH−Vb| is not less than detection error A of voltage sensor 20, that is, when voltage VH is not at the DC voltage Vb level, control device 30 determines that system relay SMRB is normal (not welded). In this situation, control device 30 determines that only system relay SMRP is welded.

After each of steps S07, S13 and S17, control device 30 generates signal EMG and outputs the signal to warning lamp 40. Warning lamp 40 is lighted up in response to signal EMG (step S19). In this situation, motor drive device 100 is not started.

As described above, when it is determined that system relay SMRP is welded upon starting of the vehicle system, starting of the vehicle system is stopped, welding of system relays SMRG, SMRB is not determined, system relay SMRB is turned off immediately, and then discharging of capacitor 13 is performed, with which resistance Rp can be protected from the large current. In addition, welding of system relay SMRB can be determined based on voltage VH between both ends of capacitor 13 or precharge current Ip during the discharging.

It is to be noted that, operations for determination of welding of system relays SMRB, SMRP, SMRG by control device 30 are actually performed by a CPU (Central Processing Unit). The CPU reads a program including each step shown in the drawing from an ROM (Read Only Memory) and performs each step shown in FIG. 4 to determine welding of system relays SMRB, SMRP, SMRG.

Therefore, the ROM corresponds to a computer (CPU)-readable record medium recording the program for allowing a computer (CPU) to perform control for determining welding of system relays SMRB, SMRP, SMRG.

In addition, in the present invention, system relays SMRB, SMRP, SMRG, resistance Rp, current sensor 26, capacitor 13, voltage sensor 20, and control device 30 construct the "power supply control device" according to the present invention. Control device 30 determining welding of system relays SMRB, SMRP, SMRG constructs a "determination portion". In the present invention, inverters 14, 31 and motor generators MG1, MG2 construct a "load".

INDUSTRIAL APPLICABILITY

The present invention is applied to a power supply control device capable of determination of welding of a relay while protecting a resistance.

The invention claimed is:

1. A power supply control device, comprising:
a first relay and a resistance connected in series between an anode of a DC power supply and a load;
a second relay connected between the anode of said DC power supply and said load in parallel with said first relay and the resistance connected in series;
a third relay connected between a cathode of said DC power supply and said load;
a current sensor detecting a DC current flowing through said resistance;
a capacity element having one terminal connected to a cathode side of said DC power supply via said third relay and the other terminal connected to an anode side of said DC power supply via said first relay and the resistance connected in series and said second relay to supply power supplied from said DC power supply to said load;
a voltage sensor detecting a voltage between both ends of said capacity element; and
a determination portion determining welding of said first to third relays; wherein
said determination portion includes
a first determination portion determining welding of said first relay based on a DC current detected with said current sensor,
a second determination portion determining welding of each of said second and third relays based on a voltage detected with said voltage sensor in each of situations wherein only said third relay is brought into conduction and only said first relay is brought into conduction according to a prescribed pattern after performance of said first determination portion, and
a determination stop portion stopping performance of said second determination portion when said first determination portion determines that said first relay is welded.

2. The power supply control device according to claim 1, wherein
said second determination portion determines welding of said second relay based on a voltage detected with said voltage sensor when only said third relay is brought into conduction to supply power from said capacity element to said load, and
said determination stop portion includes a power supply portion bringing said second and third relays out of conduction to supply power from said capacity element to said load.

3. The power supply control device according to claim 2, wherein
said determination stop portion further includes a third determination portion determining welding of said third relay based on a voltage detected with said voltage sensor when said second and third relays are brought out of conduction to supply power from said capacity element to said load.

4. The power supply control device according to claim 3, wherein
said third determination portion determines that said third relay is welded when said voltage sensor detects a voltage out of a prescribed voltage range when said second and third relays are brought out of conduction.

5. The power supply control device according to claim 2, wherein
said determination stop portion further includes a third determination portion determining welding of said third relay based on a DC current detected with said current sensor when said second and third relays are brought out of conduction to supply power from said capacity element to said load.

6. The power supply control device according to claim 5, wherein
said third determination portion determines that said third relay is welded when said current sensor detects a DC current of at least a reference value when said second and third relays are brought out of conduction.

7. The power supply control device according to claim 1, wherein
said first determination portion determines that said first relay is welded when said current sensor detects a DC current of at least a reference value when only said third relay is brought into conduction.

8. The power supply control device according to claim 1, wherein
said second determination portion determines that said second relay is welded when said voltage sensor detects a voltage out of a prescribed voltage range when only said third relay is brought into conduction to supply power from said capacity element to said load, and determines that said third relay is welded when said voltage sensor detects a voltage of at least a threshold value when only said first relay is brought into conduction to supply power from said capacity element to said load.

9. A power supply control device, comprising:
a first relay and a resistance connected in series between an anode of a DC power supply and a load;
a second relay connected between the anode of said DC power supply and said load in parallel with said first relay and the resistance connected in series;
a third relay connected between a cathode of said DC power supply and said load;
a current sensor detecting a DC current flowing through said resistance;
a capacity element having one terminal connected to a cathode side of said DC power supply via said third relay and the other terminal connected to an anode side of said DC power supply via said first relay and the resistance connected in series and said second relay to supply power supplied from said DC power supply to said load;
a voltage sensor detecting a voltage between both ends of said capacity element; and
a determination portion determining welding of said first to third relays; wherein
said determination portion includes
first determination means for determining welding of said first relay based on a DC current detected with said current sensor,
second determination means for determining welding of each of said second and third relays based on a voltage detected with said voltage sensor in each of situations wherein only said third relay is brought into conduction and only said first relay is brought into conduction according to a prescribed pattern after performance of said first determination means, and
determination stop means for stopping performance of said second determination means when said first determination means determines that said first relay is welded.

10. The power supply control device according to claim 9, wherein
said second determination means includes means for determining welding of said second relay based on a voltage detected with said voltage sensor when only said third relay is brought into conduction to supply power from said capacity element to said load, and
said determination stop means includes means for bringing said second and third relays out of conduction to supply power from said capacity element to said load.

11. The power supply control device according to claim 10, wherein
said determination stop means further includes third determination means for determining welding of said third relay based on a voltage detected with said voltage sensor when said second and third relays are brought out of conduction to supply power from said capacity element to said load.

12. The power supply control device according to claim 11, wherein
said third determination means determines that said third relay is welded when said voltage sensor detects a voltage out of a prescribed voltage range when said second and third relays are brought out of conduction.

13. The power supply control device according to claim 10, wherein
said determination stop means further includes third determination means for determining welding of said third relay based on a DC current detected with said current sensor when said second and third relays are brought out of conduction to supply power from said capacity element to said load.

14. The power supply control device according to claim 13, wherein
said third determination means determines that said third relay is welded when said current sensor detects a DC current of at least a reference value when said second and third relays are brought out of conduction.

15. The power supply control device according to claim 9, wherein
said first determination means determines that said first relay is welded when said current sensor detects a DC current of at least a reference value when only said third relay is brought into conduction.

16. The power supply control device according to claim 9, wherein
said second determination means includes
means for determining that said second relay is welded when said voltage sensor detects a voltage out of a prescribed voltage range when only said third relay is brought into conduction to supply power from said capacity element to said load, and
means for determining that said third relay is welded when said voltage sensor detects a voltage of at least a threshold value when only said first relay is brought into conduction to supply power from said capacity element to said load.

* * * * *